United States Patent
Shah

(10) Patent No.: US 10,664,821 B2
(45) Date of Patent: May 26, 2020

(54) MULTI-MODE PAYMENT SYSTEMS AND METHODS

(71) Applicant: MasterCard International Incorporated, Purchase, NY (US)

(72) Inventor: Nishith Shah, Danbury, CT (US)

(73) Assignee: Mastercard International Incorporated, Purchase, NY (US)

( * ) Notice: Subject to any disclaimer, the term of this patent is extended or adjusted under 35 U.S.C. 154(b) by 415 days.

(21) Appl. No.: 15/216,322

(22) Filed: Jul. 21, 2016

(65) Prior Publication Data

US 2017/0024720 A1 Jan. 26, 2017

Related U.S. Application Data

(60) Provisional application No. 62/195,446, filed on Jul. 22, 2015.

(51) Int. Cl.
*G06Q 20/34* (2012.01)
*G06Q 20/32* (2012.01)
*G06Q 20/36* (2012.01)
*G06Q 20/22* (2012.01)

(52) U.S. Cl.
CPC ......... *G06Q 20/322* (2013.01); *G06Q 20/227* (2013.01); *G06Q 20/3278* (2013.01); *G06Q 20/34* (2013.01); *G06Q 20/3674* (2013.01)

(58) Field of Classification Search
CPC ...... G06Q 40/00; G06Q 20/34; G06Q 20/227; G06Q 20/322; G06Q 20/3278; G06Q 20/3674
USPC ...................................... 705/39–42
See application file for complete search history.

(56) References Cited

U.S. PATENT DOCUMENTS

| | | | |
|---|---|---|---|
| 9,704,151 B2 * | 7/2017 | Zhou | G06Q 20/3221 |
| 9,811,818 B1 * | 11/2017 | Xing | A61B 10/0051 |
| 2013/0282502 A1 | 10/2013 | Jooste | |
| 2015/0227923 A1 * | 8/2015 | Kutsch | G07C 9/257 705/67 |
| 2015/0339663 A1 | 11/2015 | Lopreiato et al. | |
| 2015/0339696 A1 * | 11/2015 | Zhou | G06Q 20/322 705/14.23 |

(Continued)

OTHER PUBLICATIONS

Host Card Emulation (HCE) 101, A Smart Card Alliance Mobile & NFC Council White Paper, Aug. 2014, Publication No. MNFCC-14002, retrieved on Aug. 26, 2016, Retrieved from the Internet: <URL:http://www.smartcardalliance.org/downloads/HCE-101-WP-FINAL-081114-clean.pdf>, (pp. 1-32, 32 total pages).

(Continued)

*Primary Examiner* — Hani M Kazimi
(74) *Attorney, Agent, or Firm* — Buckley, Maschoff & Talwalkar LLC

(57) ABSTRACT

Systems, methods, apparatus and computer program code are provided to receive payment card and mobile identity information from a mobile device associated with a user, determine account and mobile device eligibility and capability and in the case where the mobile device is NFC capable, triggering a tokenization process to generate a tokenization record associated with the payment card, storing the payment card information associated with the user securely, and transmitting card reference information associated with at least one of (i) the tokenization record, and (ii) the stored payment card information to the mobile device for use in transactions.

15 Claims, 3 Drawing Sheets

(56) References Cited

U.S. PATENT DOCUMENTS

| | | | |
|---|---|---|---|
| 2016/0012465 A1* | 1/2016 | Sharp | G06Q 20/18 705/14.17 |
| 2016/0189137 A1* | 6/2016 | Zhou | G06Q 20/3274 705/14.34 |
| 2017/0221050 A1* | 8/2017 | Jivraj | G06Q 20/3674 |
| 2019/0050845 A1* | 2/2019 | Deshmukh | G06Q 20/102 |

OTHER PUBLICATIONS

"JNSA Press vol. 40", Autumn 2015, retrieved on Aug. 26, 2016, Retrieved from the Internet: <URL:http://www.jnsa.org/insapress/vol40/JNSA_Press_No40_.pdf>, (pp. 1-7, 7 total pages).

"PCT Notification of Transmittal of the International Search Report and the Written Opinion" International Searching Authority, Sep. 6, 2016 (Sep. 6, 2016), 8pgs.

\* cited by examiner

MULTI-MODE PAYMENT SYSTEMS AND METHODS

CROSS-REFERENCE TO RELATED APPLICATION

This application claims benefit of, and priority to, U.S. Provisional Patent Application Ser. No. 62/195,446 filed on Jul. 22, 2015, the contents of which are hereby incorporated in their entirety for all purposes.

BACKGROUND

The present inventors have now recognized an opportunity for a highly convenient way to implement and access the advantages of a digital wallet. More particularly, the present inventors have recognized the need for digital wallets which allow two different modes of payment via the same wallet, including a mode that allows a user to conduct a payment transaction at a point of sale that supports near field communication ("NFC") transactions as well as at a point of sale that does not support NFC transactions.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

Figure 1:
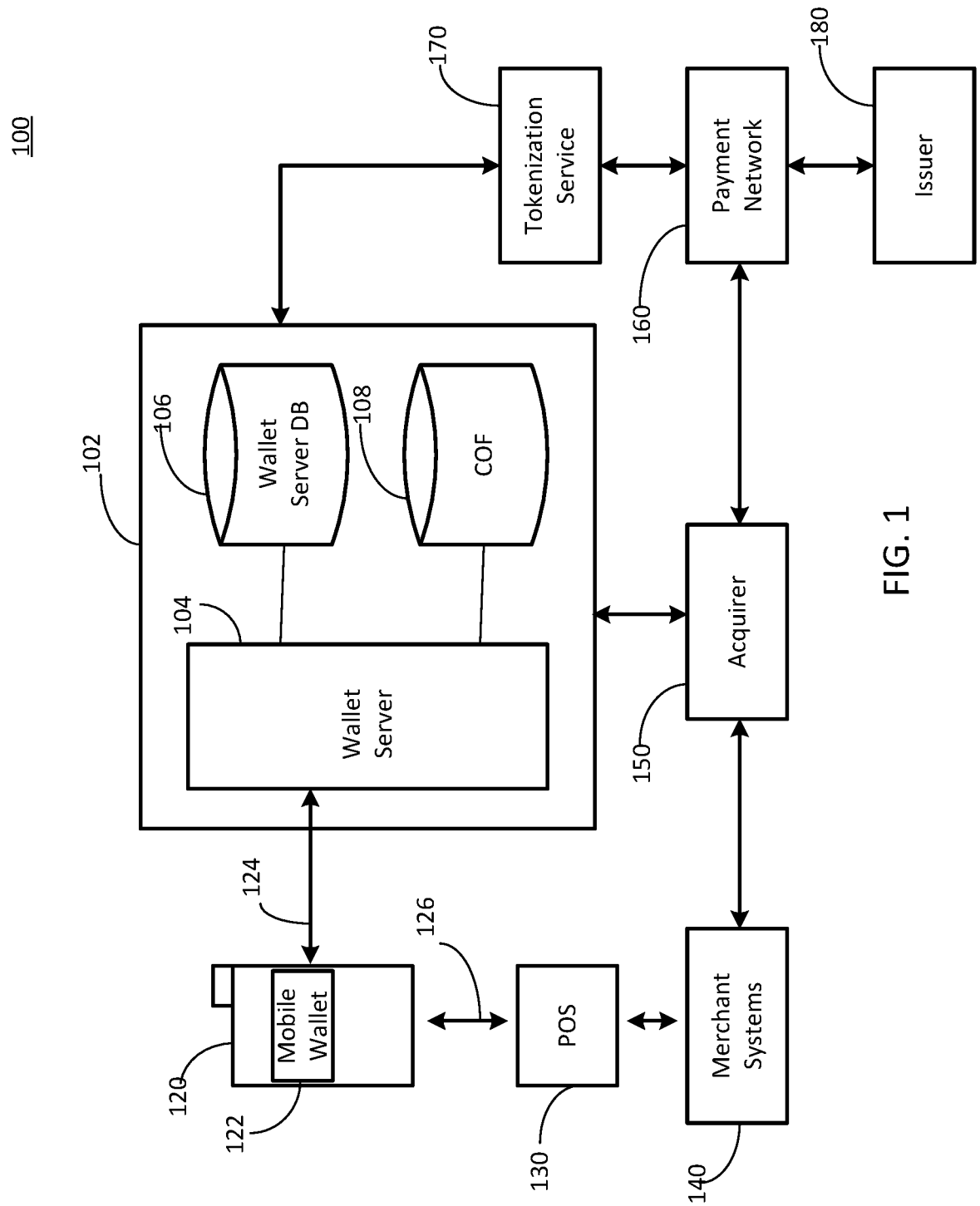
FIG. 1 is a block diagram that illustrates a payment system provided in accordance with aspects of the present invention.

In general, and for the purpose of introducing concepts of embodiments of the present invention, a wallet services system allows a user to access his/her digital wallet at the point of sale by presenting a payment information to the POS terminal. Pursuant to the present invention, the digital wallet may be used at POS terminals that support either NFC transactions, terminals that support barcode or "QR code" transactions, or terminals that support either NFC or barcode transactions. Embodiments provide systems and methods for allowing a user to register payment card information such that it is accessible to the digital wallet in transactions at different types of POS terminals. Further, in some embodiments, the user's mobile device may not support NFC transactions (e.g., the mobile device may not be "NFC-enabled"). Embodiments of the present invention allow such devices to be used in transactions using bar code payment methods.

Embodiments of the present invention will now be described by reference to FIG. 1 which is a block diagram that illustrates a payment system 100 pursuant to some embodiments. The system 100 includes a number of devices and components, including a mobile device 120 having a mobile wallet application 122 which interacts with a remote wallet platform 102 via a wireless connection 124. The wallet platform 102 may be operated by or on behalf of an entity such as MasterCard International Incorporated to facilitate transactions pursuant to the present invention. The wallet platform 102 may have or be in communication with a number of components including one or more wallet servers 104, one or more wallet databases 106 and one or more card on file ("COF") databases 108 (which may be configured and controlled to ensure data and transmission security in accordance with Payment Card Industry ("PCI") security standards).

The wallet platform 102 may be further in communication with a tokenization service 170 (which may be, for example, the MasterCard Digital Enablement Service ("MDES") offered by MasterCard International Incorporated), as well as one or more merchant acquirer systems 150.

Pursuant to some embodiments, the system 100 may be operated to allow a user operating a mobile device 120 to configure, install or update a digital wallet 122 to operate pursuant to the present invention. Once a user has configured their mobile device 120, the system 100 may be operated to facilitate transactions involving the mobile wallet 122 and a merchant. For example, the mobile wallet 122 may be used in a transaction at a point of sale ("POS") 130 associated with a merchant system 140. Pursuant to some embodiments, the POS 130 may be a near field communication ("NFC") enabled point of sale device or a QR code enabled point of sale device (or other barcode or image based POS). Embodiments allow transactions to be conducted based on the mode of operation supported by the POS, as well as the mode of operation supported by the mobile device 120 (e.g., a mobile device 120 that does not support NFC communication may be used to conduct transactions using a QR code, while an NFC-enabled mobile device 120 may be used to conduct both NFC transactions and QR code transactions).

The mobile device 120 may be a smart phone or other mobile device such as, for example, an iPhone®, an Android® phone, or any phone that can access and display Web content or access the Internet. In some embodiments, the mobile device 120 communicates with the remote wallet platform 102 using a cellular or wireless network. In some embodiments, the mobile device 120 may have a camera (not shown) or other image capture device which allows the mobile device 120 to capture an image or representation of a barcode or QR code. For example, a user may operate the mobile device 120 to take a digital picture or capture the image of a QR code displayed on or at a merchant point of sale device to initiate a payment transaction using the present invention. As will be described further below, the QR code may be used to initiate and conduct transactions pursuant to some embodiments. In some embodiments, the mobile device 120 may be configured such that a user may operate a camera of the mobile device 120 to take a picture or capture an image of a QR code and then share or transmit the image to a remote wallet platform 102 automatically by selecting a mobile wallet icon shown on a sharing window of the mobile device 120. The mobile wallet may be shown on the sharing window by enabling a sharing property in metadata of the mobile wallet application. This will help the user to capture the QR code image and then allow the user to select an option of the mobile wallet application to share the QR code (causing it to be transmitted to the wallet platform 102). This is also one convenient way to conduct a transaction even without launching a mobile wallet application either when the mobile device 120 is locked or unlock.

For example, on an Android mobile device, a camera option will be selected from a lock screen or after unlocking the mobile device, capturing a QR code, sharing that QR code with a mobile wallet and operating the mobile wallet to send that QR code to a wallet server. Once the wallet server receives the QR code, it will scan and parse the QR code, will prepare a transaction/authorization request and will send the transaction request to acquirer or other entity in the payment network. As will be described further below, users who wish to conduct QR code initiated transactions may simply and efficiently initiate a transaction by operating the camera of the mobile device 120 from a lock or unlock screen of the mobile device 120, capture an image of a QR code and share or transmit it to the remote wallet platform 102 by selecting a mobile wallet icon from a share window of the mobile device 120 for processing as described further below.

The POS 130 may include a reader component which may allow the POS device to function as an NFC reader to read information from the mobile device 120. The POS 130 may also be configured to allow QR codes to be presented or displayed (or may have a static QR code associated with it). The reader component and the POS 130 may be located at the premises of a retail store and operated by a sales associate of the retailer for the purpose of processing retail transactions. The mobile device 120 is shown in FIG. 1 to be interacting with the POS 130 via communication link 126 for the purpose of executing such a transaction.

As shown in FIG. 1, the system 100 may also include one or more computers 150 operated by an acquirer (acquiring financial institution). The acquirer 150 may operate in a conventional manner to receive an authorization request for the transaction from the POS 130 or the merchant systems 140. The acquirer 150 may route the authorization request via a payment network 160 to an issuer device or system 180 operated by the issuer of a payment card account that is associated with the mobile wallet 122 of the mobile device 120. An authorization response generated by the issuer 180 may be routed back to the POS 130 via the payment network 160 and the acquirer 150.

One well known example of a payment network is referred to as the "Banknet" system, and is operated by MasterCard International Incorporated, which is the assignee hereof.

The issuer device 180 may be operated by or on behalf of a financial institution ("FI") that issues payment card accounts to individual users. For example, the issuer device 180 may perform such functions as (a) receiving and responding to requests for authorization of payment card account transactions to be charged to payment card accounts issued by the FI; and (b) tracking and storing transactions and maintaining account records.

The components of the system 100 as depicted in FIG. 1 are only those that are needed for processing a single transaction. A typical payment system may process many purchase transactions (including simultaneous transactions) and may include a considerable number of payment card issuers and their computers, a considerable number of acquirers and their computers, and numerous merchants and their POS terminals and associated proximity reader components. The system may also include a very large number of payment card account holders, who carry mobile devices operating mobile wallets for initiating payment transactions by presenting an associated payment card account number to the reader component of a POS terminal.

Figure 2:
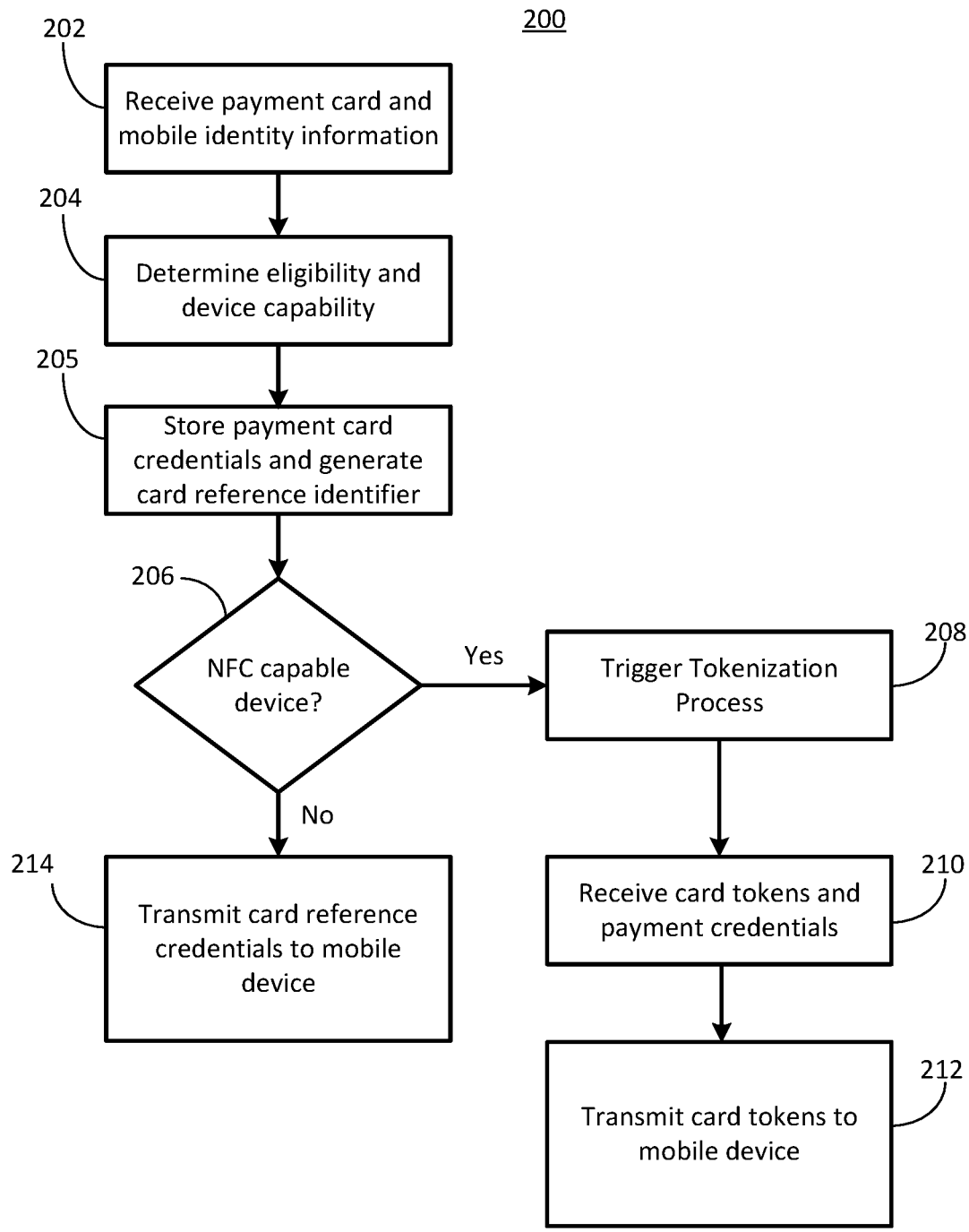
FIG. 2 is a flow chart that illustrates a payment card registration process that may be performed using the system of FIG. 1 in accordance with aspects of the present invention.

Reference is now made to FIG. 2 where an illustrative process 200 that may be implemented using the system 100 will be described in which a user operating a mobile device 120 may register one or more payment accounts for use in the system 100.

The process 200 may begin at 202 where a system (such as the wallet platform 102 of FIG. 1) receives payment card and mobile identity information from a user of a mobile device 120 (e.g., such as one in which a mobile wallet 122 has previously been downloaded or which is downloaded during the process 200). The wallet platform 102 performs processing to determine eligibility and device capability (which may include, for example, determining whether the mobile device 120 supports NFC payment functionality, as well as determining whether the payment account is qualified for use in the mobile wallet system). If the mobile device 120 is NFC capable, processing continues at 208 where a tokenization process is triggered (to tokenize the payment credentials). Processing continues at 210 where the card tokens and payment credentials are received (e.g., from a remote tokenization service such as the service 170 of FIG. 1). Processing continues at 214 where the payment card credentials are stored (e.g., in a COF database such as the database 108 of FIG. 1), and a card reference identifier is generated. Processing continues at 214 where the card reference identifier is transmitted for storage on the mobile device 120. In the event that the mobile device 120 was determined to be NFC capable, processing may continue at 212 where the card tokens (as well as, in some embodiments, the card reference identifier) may be transmitted to mobile wallet 122 of the mobile device 120 by wallet server 104.

In general, this functionality will allow a user to add one or more payment cards in the wallet application 122. In some embodiments, the processing may differ if the mobile device and mobile wallet application use host card emulation ("HCE"). For example, if the mobile wallet application uses HCE, the wallet platform 102 may be required to interact with the tokenization provider 170 in order to download tokens/payment credentials which are associated with user's payment card and used at the time of payment. However, after adding a payment card in an HCE based phone, the user should be able to do contactless payment and/or QR code payment, subject to the successful addition of a payment card. In general, the user experience for the process 200 for non-HCE and HCE/NFC based device will be similar.

In general, the process 200 may also be described as follows. First, the user will enter their payment card details by interacting with the mobile wallet application. Next, the mobile wallet application will send the payment card details to the wallet platform along with the user's mobile device fingerprint and mobile device details. The wallet platform 102 will receive the card information along with the user's and the user's device information. Once the wallet server 102 identifies if the mobile device 120 is capable of NFC based transactions, it triggers a tokenization process by sending the payment card details to the tokenization system 170.

If the wallet platform 102 recognizes that user's mobile device 120 is not capable of doing NFC based transactions, the wallet platform 102 stores the user's payment card credentials (in the COF database 108) and responds back to the user with information about the results and a card reference identifier. If the payment card is tokenizable, and the tokenization process has completed successfully, card tokens/payment credentials are downloaded to the mobile wallet application and the wallet platform 102 responds to the mobile wallet application with the card reference information.

At this point, the user is ready to use the mobile wallet application to conduct transactions. If the payment card was tokenizable and the mobile device supports NFC transactions, the mobile wallet can be used to conduct either NFC based transactions or QR code based transactions. The issuer's required or selected cardholder verification method ("CVM") can be applied or enforced during the process 200. In some embodiments, the payment card issuer may also be consulted during the process 200 to validate payment card details and validity.

A transaction involving a mobile wallet pursuant to the present invention will now be described. In a first example, a transaction will be described in which the payment card was successfully registered (using the process of FIG. 2) and the merchant location supports NFC transactions (but not QR code transactions). In such an environment, the transaction may proceed as follows.

1. User launches the mobile wallet application on their mobile device
2. User has at least 1 loaded card which is enabled for NFC and QR code based transaction
3. User selects NFC symbol for transaction after user learns from merchant that they support NFC transactions
4. Application opens the NFC session and before transmitting transaction data, application may ask user to enter PIN for transaction
5. User enters PIN and transaction information is passed to NFC terminal
6. Transaction is routed as a normal NFC transaction.
7. User receives confirmation over the air or pulls transaction status from backend system/wallet platform based on card reference identifier In a second example transaction, a user who has registered a card using the process of FIG. 2 wishes to make a transaction using the mobile wallet at a merchant location that accepts QR codes for payments (but does not accept NFC transactions). The user launches the mobile wallet application on their mobile device and selects a desired payment card for use by interacting with the mobile wallet application. The user learned from the merchant that the merchant accepts only QR code payment and not NFC, so the user launches a camera screen on the mobile device 120 to conduct a QR code based payment transaction. The following steps occur:

1. Merchant generates QR code at terminal after inputting all transaction information like final amount, purchase details, merchant details etc. (or, the merchant may display a static QR code at the POS that encodes the merchant information but not the transaction information).
2. User selects desired payment card from wallet application
3. Wallet application prompts user to select mode of payment
4. User selects QR code mode as merchant does not accept NFC based transaction.
5. User may be asked to enter security code/PIN based on wallet providers or issuer's need
6. User scans QR code at POS
7. Wallet application scans QR code, extracts data inside QR code, and sends transaction details information to wallet platform.
8. Wallet platform receives transaction request from wallet application, validates information, extracts card reference identifier from transaction request, maps actual PAN (from the COF database) from card reference identifier and builds a transaction authorization request for merchant acquirer or processor.
9. Once transaction authorization request is created, wallet platform sends request to merchant acquirer.
10. Merchant acquirer verifies and validates transaction request and forwards authorization request to issuer
11. Issuer authorizes the transaction and responds back to merchant acquirer.
12. Merchant acquirer sends one responds to wallet platform and other sends other response to merchant (either via SMS or via other channel)
13. Wallet platform receives confirmation of transaction from merchant acquirer, records basic transaction information and sends transaction successful information response to wallet application
14. Wallet application displays successful message to user.

Pursuant to some embodiments, the second example transaction (or other transactions involving QR codes) may be made efficiently by a user who has installed the mobile wallet application of the present invention on a mobile device 120 having a camera. In some embodiments, the user may initiate a payment transaction by simply interacting with the camera of their mobile device 120 from the mobile device's lock screen or by launching the camera of the mobile device 120 after unlocking the mobile device 120 and capturing an image of a QR code at a merchant location (or on a printed material, a Website, or the like). The act of capturing the image, in some embodiments, allows the user to select to "share" or transmit the captured image to an endpoint or location associated with a remote wallet server 102. Meta data associated with the mobile device 120 may be transmitted with the image allowing the remote wallet server 102 to identify the user and/or the mobile device 120 as associated with a participant who has enrolled one or more payment card accounts with the wallet server. That is, in such embodiments, steps 1-7 of the second example transaction (or portions thereof) may be performed quickly and efficiently by the user acting to operate the camera of the mobile device 120 to capture an image of a QR code. In some embodiments, the user may be required to log in to or otherwise launch the mobile wallet application prior to operating the camera to capture the image; in other embodiments, the user may simply be required to launch the camera application to initiate the transaction.

In some embodiments of the system 100, individuals who have a number of payment card accounts, perhaps from varying issuers, may enroll with the wallet service provider to set up digital wallets for themselves to be maintained by the wallet service provider. For example, they may do so by interacting with a webpage that is hosted by the wallet service provider computer. Once an individual user has established a user account via the webpage, he/she may request the wallet service provider computer to establish his/her digital wallet, which may take the form of a data partition in a database stored in the wallet service provider computer. The user may also take advantage of software tools provided through the wallet service provider computer to add one or more of the user's payment card accounts to his/her digital wallet. In some embodiments, this may be done by authorizing the wallet service provider computer to contact the issuers of the payment card accounts to initiate a process of loading the relevant account data into the user's digital wallet. In some embodiments, as part of this process, the issuers may contact the user to confirm that the request from the wallet service provider computer is indeed authorized by the user.

Figure 3:
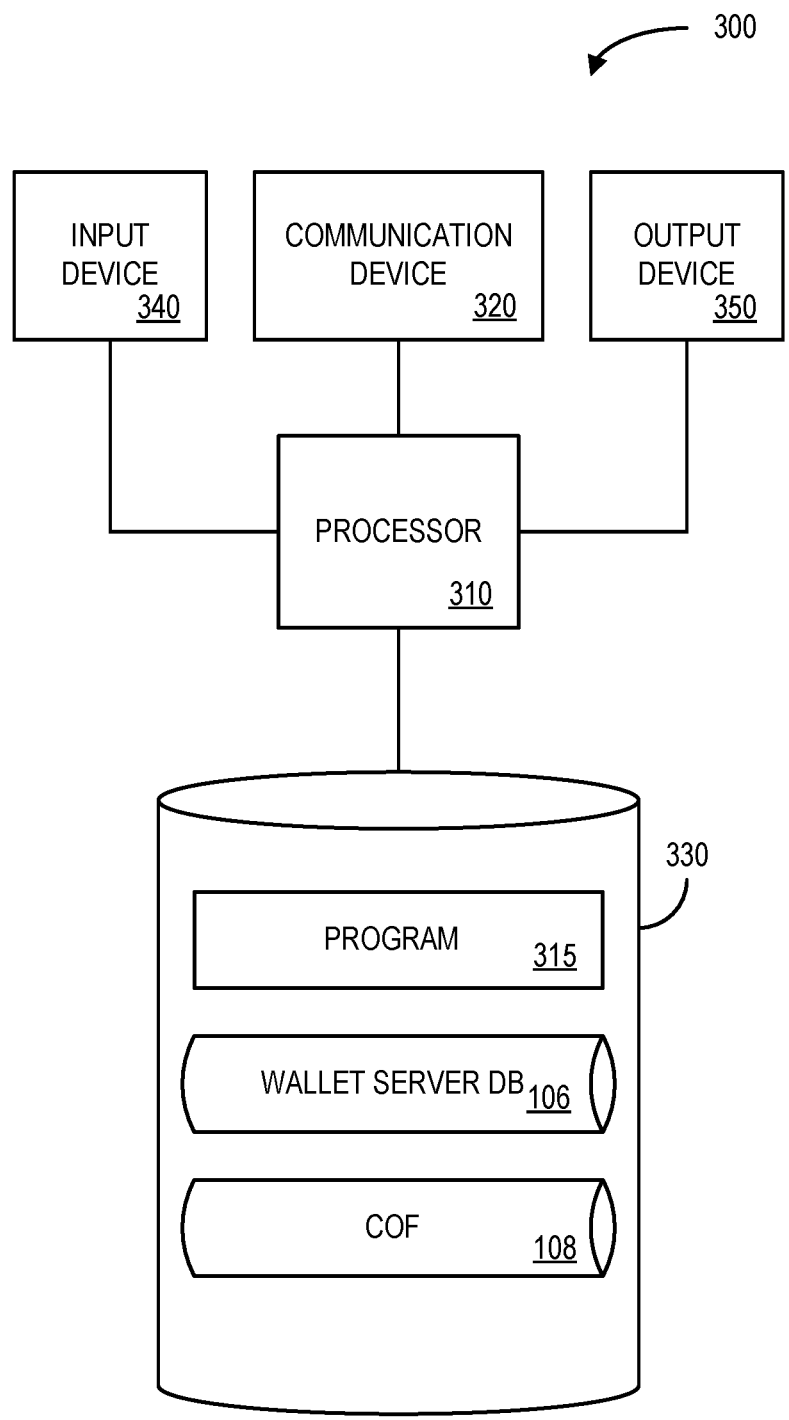
FIG. 3 is a block diagram of an apparatus in accordance with some embodiments of the present invention.

FIG. 3 illustrates a remote wallet platform computer server 300 that may be, for example, associated with the system 100 of FIG. 1. The remote wallet platform computer server 300 comprises a processor 310, such as one or more commercially available Central Processing Units ("CPUs") in the form of one-chip microprocessors, coupled to a communication device 320 configured to communicate via a communication network (not shown in FIG. 3). The communication device 320 may be used to communicate, for example, with one or more remote administrator or computers and/or communication devices (e.g., PCs and smartphones). Note that communications exchanged via the communication device 320 may utilize security features, such as those between a public internet user and an internal network of a financial institution or service provider. The security features might be associated with, for example, web servers, firewalls, and/or PCI infrastructure. The remote wallet platform computer server 300 further includes an input device 340 (e.g., a mouse and/or keyboard to enter information about mobile wallets, transactions, etc.) and an output device 350 (e.g., to output requests, reports, etc.).

The processor 310 also communicates with a storage device 330. The storage device 330 may comprise any appropriate information storage device, including combinations of magnetic storage devices (e.g., a hard disk drive), optical storage devices, mobile telephones, and/or semiconductor memory devices. The storage device 330 stores a program 315 or application for controlling the processor 310. The processor 310 performs instructions of the program 315, and thereby operates in accordance with any of the embodiments described herein. For example, the processor 310 may conduct or administer transactions in conjunction with mobile devices such as described in conjunction with FIG. 2.

In particular, the processor 310 might be operated to receive information from a mobile device 120 to allow a user to register payment card information such that the information is accessible to a mobile wallet application on the mobile device in transactions at different types of POS terminals.

The program 315 may be stored in a compressed, uncompiled and/or encrypted format. The program 315 may furthermore include other program elements, such as an operating system, a database management system, and/or device drivers used by the processor 310 to interface with peripheral devices.

As used herein, information may be "received" by or "transmitted" to, for example: (i) the remote wallet computer server 300 from another device; or (ii) a software application or module within the remote wallet computer server 300 from another software application, module, or any other source.

In some embodiments (such as shown in FIG. 3), the storage device 330 further stores a wallet server database 106 and a card on file database 108 (as described above in conjunction with FIG. 1). Note that the databases described herein are only examples, and additional and/or different information may be stored therein. Moreover, various databases might be split or combined in accordance with any of the embodiments described herein. For example, the wallet server database 106 and/or card on file database 108 might be combined and/or linked to each other within the program 315.

In addition to including payment card accounts such as credit card accounts and debit card accounts to their digital wallets, the users may include other types of accounts as well, such as gift card accounts, loyalty rewards accounts, benefit disbursement accounts, transit access accounts, etc. The accounts may all be branded from one payment network, or there may be accounts branded from more than one payment network in the user's digital wallet.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable.

As used herein and in the appended claims, the term "payment card account" includes a credit card account, a deposit account that the account holder may access using a debit card, a prepaid card account, or any other type of account from which payment transactions may be consummated. The term "payment card account number" or "PAN" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment card system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising: receiving payment card and mobile identity information from a mobile device associated with a user; determining account and mobile device eligibility and capability and in the case where the mobile device is NFC capable, triggering a tokenization process to generate a tokenization record associated with the payment card; storing the payment card information associated with the user securely; causing a prompt to be displayed to the user of the mobile device to select one of: a first mode of payment for the transaction that uses the tokenization record, and a second mode of payment for the transaction that uses card reference information associated with the stored payment card information, wherein selection of the first mode of payment comprises: transmitting, from the mobile device to a payment terminal, card reference information associated with the tokenization record, and wherein the transmission comprises: operating the mobile device to capture a code from a point of sale location without actually launching a mobile application; and transmitting the code to the remote wallet platform; selecting the desired mode of payment for the transaction; transmitting card reference information associated with at least one of (i) the tokenization record, and (ii) the stored payment card information to the mobile device for use in transactions.

2. The method of claim 1, wherein the storing the payment card information associated with the user is performed if the mobile device is not NFC capable.

3. The method of claim 1, wherein the first mode of payment may be used at a merchant location accepting NFC transactions.

4. The method of claim 1, wherein selecting the desired mode of payment further comprises: receiving a selection of the second mode of payment; and transmitting, from the mobile device to a remote wallet platform, card reference information associated with the stored payment card information.

5. The method of claim 1, further comprising: retrieving a default stored payment card information; associating the stored payment card information with transaction information identified based on the code; and completing a transaction using the stored payment card information and the transaction information.

6. The method of claim 1, wherein the operating the mobile device to capture a code further comprises: operating a camera of the mobile device to capture an image of the code.

7. A mobile device, comprising: a display screen; a communication port; a processor; a memory; and a program, wherein the program is stored in the memory and configured to be executed by the processor, the program including: receiving payment card information from a user; Amendment and Response to Sep. 19, 2019 Non-Final Office Action transmitting the payment card information and information identifying the mobile device to a remote wallet server; and causing a prompt to be displayed to the user of the mobile device to select one of: a first mode of payment for the transaction that uses the tokenized card record, and a second mode of payment for the transaction that uses the identifier associated with the payment card information stored at the remote wallet server wherein selection of the first mode of payment comprises: transmitting, from the mobile device to a payment terminal, card reference information associated with the tokenization record, and wherein the transmission comprises: operating the mobile device to capture a code from a point of sale location without actually launching a mobile application; and transmitting the code to the remote wallet platform; receiving selection of the desired mode of payment for the transaction; receiving, from the remote wallet server, card reference information generated for use in transactions, the card reference information associated with at least one of (i) a tokenized card record, and (ii) an identifier associated with the payment card information stored at the remote wallet server, wherein the card reference information is generated based at least in part on a capability of the mobile device.

8. The mobile device of claim 7, wherein the tokenized card record is generated if the mobile device is NFC capable.

9. The mobile device of claim 7, wherein the identifier associated with the payment card information stored at the remote wallet server is received if the mobile device is not NFC capable.

10. The mobile device of claim 7, wherein the first mode of payment may be used at a merchant location accepting NFC transactions.

11. The mobile device of claim 7, wherein receiving selection of the desired mode of payment for the transaction further comprises: receiving a selection of the second mode of payment; and transmitting, from the mobile device to a remote wallet platform, the identifier associated with the payment card information stored at the remote wallet server.

12. The mobile device of claim 11, wherein the transmitting the identifier further comprises: operating the mobile device to capture a code from a point of sale location without actually opening a mobile application; and transmitting the code to the remote wallet platform.

13. The mobile device of claim 12, further comprising: causing the remote wallet server to retrieve the default stored payment card information; causing the remote wallet server to associate the stored payment card information with transaction information identified based on the code; and completing a transaction using the stored payment card information and the transaction information.

14. The mobile device of claim 12, wherein the operating the mobile device to capture a code further comprises: operating a camera of the mobile device to capture an image of the code.

15. The method of claim 1, wherein selecting the desired mode of payment for the transaction is based on a capability of the mobile device and a mode of payment for the transaction accepted at the merchant location.

* * * * *